March 3, 1931.   D. C. GARROWAY   1,794,763
CIRCUIT INTERRUPTER
Filed Jan. 2, 1926   2 Sheets-Sheet 1
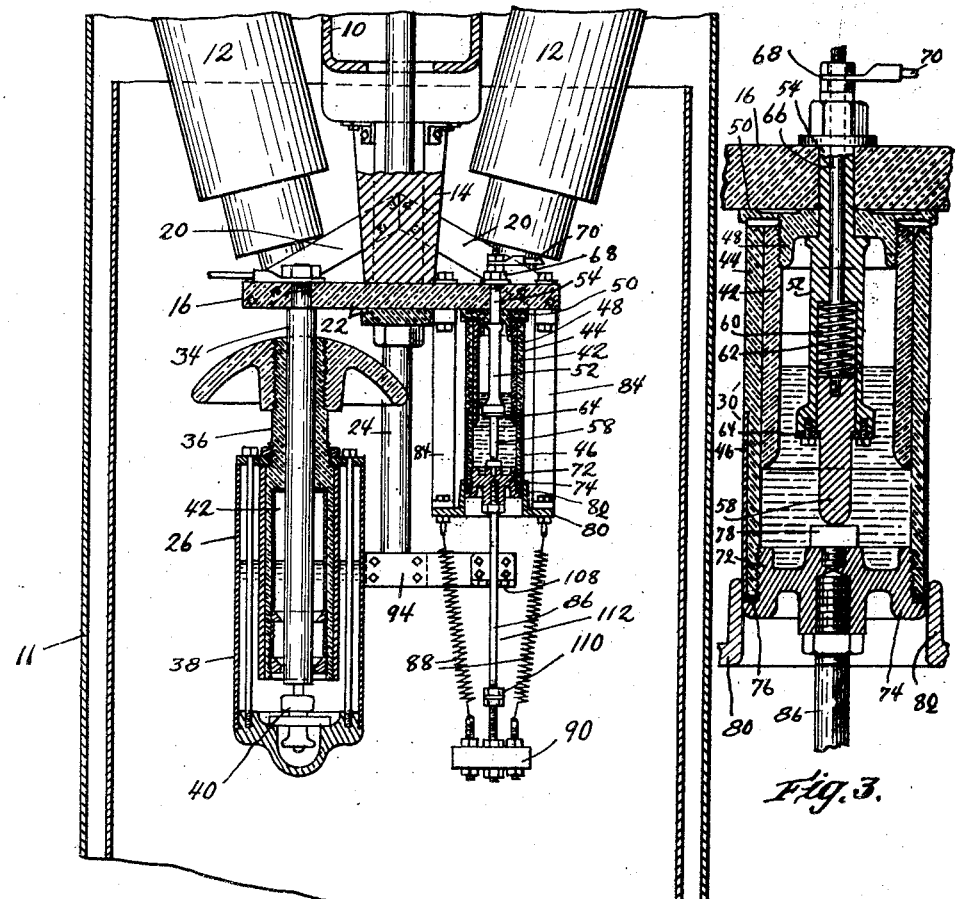
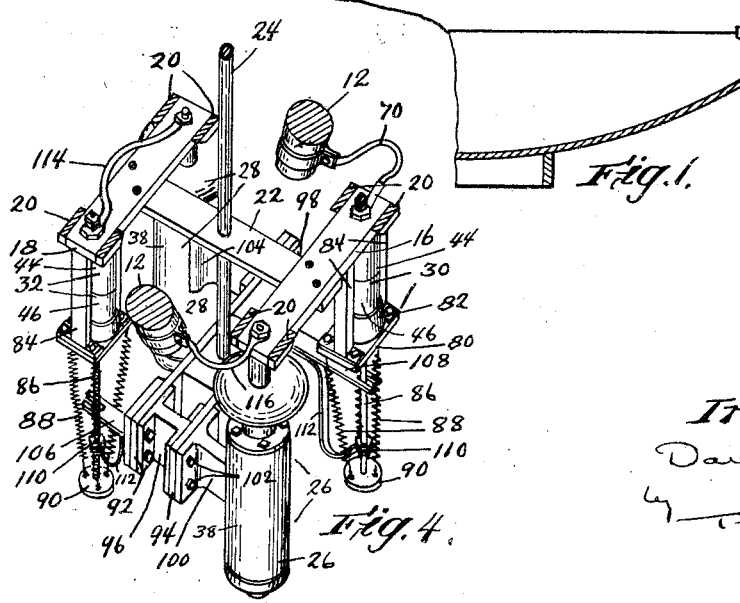
Inventor,
David C Garroway
by T. Greenwood
atty Patented Mar. 3, 1931

1,794,763

UNITED STATES PATENT OFFICE

DAVID C. GARROWAY, OF BELMONT, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS

CIRCUIT INTERRUPTER

Application filed January 2, 1926. Serial No. 78,817.

This invention relates to circuit interrupters of the type disclosed in my co-pending application Serial No. 30,294, filed May 14, 1925, wherein an electrolyte is employed to assist the circuit interrupting operation.

In this application and in two other co-pending applications, namely: Serial No. 78,815, filed January 2, 1926, and Serial No. 78,816, filed January 2, 1926, I have illustrated various constructions of circuit interrupters having an electrolyte-containing switch which is adapted to interrupt the circuit under load and an oil containing switch which is adapted to disconnect the electrolyte-containing switch from the line after the load has been interrupted.

The present invention relates mainly to the disconnecting switch and has for an object the provision of an improved form of disconnecting switch especially adapted, although not limited for service in connection with electrolyte-containing switches of the types above set forth.

A further object of the invention is the provision of a circuit interrupter having serially-connected electrolyte-containing and oil-containing switches and means to operate both switches in a predetermined order.

A further object of the invention is generally to improve the construction and operation of circuit interrupters.

Fig. 1 is a front elevation partly in section and illustrating that portion of a circuit interrupter in which the invention resides.

Fig. 3 is an enlarged sectional elevation of the disconnecting switch.

Fig. 4 is a perspective view of the switch elements and illustrating particularly the circuit path therethrough.

Figure 2:
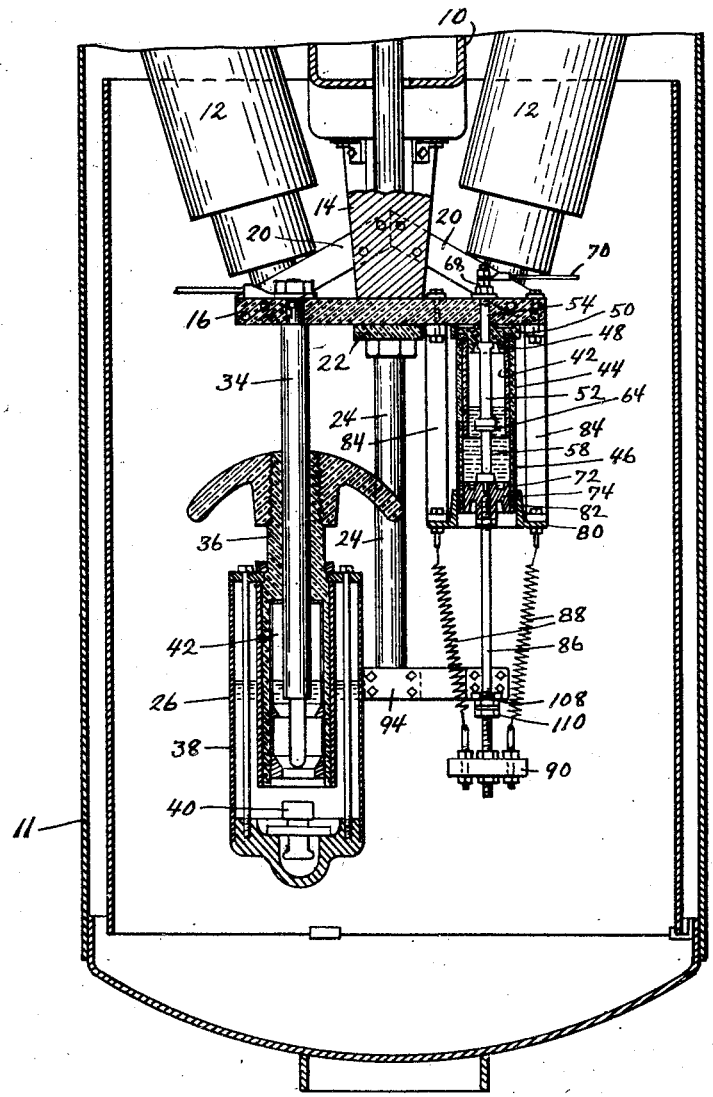
Fig. 2 is a view similar to Fig. 1 but illustrating the position of the mechanism at the start of separation of the contact members of the oil immersed disconnecting switch.

The circuit interrupter here shown includes a housing 10 which is adapted to support and enclose the operating mechanism and a casing 11 within which the switch elements are enclosed. The housing 10 supports a pair of switch terminals 12 which depend into the casing. A pair of pillars 14, one being here shown, are secured to the lower wall of said housing 10 and depend therebelow. Insulating bars 16 and 18 are secured to the lower ends of said pillars and extend horizontally in both directions therebeyond. Braces 20 are secured to the ends of said bars and also to said pillars. An insulating cross bar 22 is extended between and is secured to said cross bars 16 and 18 beneath said pillars and serves to guide the switch rod 24 of the movable switch member in its vertical movements between switch open and closed positions.

The circuit interrupter here shown is provided with two electrolyte-containing switches 26 and 28 and two disconnecting switches 30 and 32, the fixed members of which switches are carried by said cross bars 16 and 18. The electrolyte-containing switches are similar. Each comprises a conducting rod 34 which is fixed to an end of one of said insulating bars and extends freely through a tubular insulator 36 carried by the pot 38. Said pot 38 is provided with a contact member 40 in the bottom thereof which cooperates with said contact rod 34 to control the metallic circuit through the switch. Said insulator 36 is formed with an internal chamber 42 at its lower end through which said rod passes. Said chamber is open at its lower end and is thereby in communication with the interior of said pot 38. Said chamber and pot are adapted to contain a suitable electrolyte at some normal level $a$—$a$ which is approximately the same in both the chamber and the pot. The pot 38 and the insulator 36 are adapted to be moved downwardly for circuit interruption whereby to withdraw the contact member 40 from engagement with the fixed contact rod 34 whereby to interrupt the metallic circuit through the interrupter. The function of the electrolyte in assisting circuit interruption has been set forth in my above named co-pending applications and need not be further described herein.

After the aforesaid contact members have become separated and the pots have been moved downwardly to positions wherein the fixed contact rods are at or slightly above the normal electrolyte level in the pots, the circuit through the interrupter is adapted to be interrupted under an insulating fluid, as oil, in the disconnecting switches 30 and 32, the construction and arrangement of which elements comprises one of the principal objects of this invention.

The disconnecting switches 30 and 32 are identical and the construction of the disconnecting switch 30 is herein described. Said switch includes an enclosing casing formed by the telescoping tubes 42 and 44 which tube 44 surrounds the tube 42 and moves axially relatively thereto. Said tubes 42 and 44 are composed of some insulating material as bakelite. The lower end of said tube 44 may be reinforced with a strong metal shell 46 whereby to strengthen said tube in the vicinity of the contact members therein and to support said tube against internal pressures which may be developed if a circuit interrupting arc should form therein. Ordinarily, however, the work of circuit interruption is adapted to take place entirely in the electrolyte-containing switches and the contact members of the disconnecting switches are not intended to separate under load. The inner tube 42 is internally screw-threaded onto the boss 48 of a supporting plate 50, attached to the lower face of the insulating bar 16. A stationary contact supporting member 52 is disposed within said tube 42 and has a reduced extension 54 which extends through an aperture in said insulating bar 16. The upper end of said extension is provided with a nut which serves to clamp the contact holder 52 and the plate 50 and its insulating tube 42 to the insulating bar 16.

The stationary contact member comprises a cylindrical rod 58 which has an enlarged upper end that is received slidably within a cylindrical recess 60 in the contact holder 52. A compression spring 62 is disposed within said recess above said contact member and serves to urge it downwardly. A plate 64 is secured to the lower end of said contact holder and has an aperture therein through which the lower end of the contact member is freely extended. The enlarged upper portion of said contact member is adapted to engage said plate, whereby to limit the downward movement of the contact member. The contact member, however, is permitted a substantial amount of upward movement under control of said spring. A rod 66 is secured to the upper end of said contact member and is extended freely through said contact holder and terminates at its upper end in binding means 68 for a flexible circuit lead 70, which lead may be connected to one of the terminals of the interrupter, as illustrated in Fig. 4.

The lower end of the outer tube 44 is internally screw-threaded onto the boss 72 of a circular bottom cap 74. If desirable, a packing ring 76 may be interposed between said cap and the lower end of said tube whereby to seal the joint thereat against the escape of fluid.

A contact member 78 is carried removably by said cap within said tube and is adapted to engage with said contact member 58 to complete the circuit through the disconnecting element.

The upper end of said outer tube is adapted to fit closely about said inner tube 42 so that the movement of the upper end of said outer tube is guided for free movement in a straight line. The close sliding fit between the tubes also prevents undue escape of oil from the casing. The lower end of said outer tube is received in a guideplate 80, which plate has an upstanding circular flange 82 which closely surrounds the lower end of said outer tube and cap 74. Said plate is supported beneath the insulating bar 16 by suitable insulating means as the insulating rods 84, which rods are fixed to said insulating bar 16 and also to said plate 80.

The control of the circuit through said contact members 58 and 78 is effected by means including a rod 86, which rod is screw-threaded into said cap 74 and extends therebelow. Said contact members are normally biased for circuit-closing movement by means including a plurality of tensile springs 88, three springs being here shown. The upper ends of said springs are secured to said guide-plate 80 and the lower ends thereof are secured to a supporting-plate 90 which plate is adjustably screw-threaded upon the lower end of said rod 86.

The movable members of the disconnecting switch have provision for lost motion connection with the movable switch member. The movable switch member includes a pair of insulating bars 92 and 94 which bars are disposed horizontally in spaced parallel relation at the lower end of the switch rod 24 and are fixed thereto. The outer ends of said bars are connected rigidly together by metal brackets 96 and 98 which are disposed between said bars. The supporting bracket 100 for the electrolyte-containing switch 26 is secured to one end of the bar 94 and is electrically connected with said bracket 96 by means including the bolts 102. The bracket 104 of the other electrolyte-containing switch 28 is similarly connected to the opposite end of the insulating bar 92 and is electrically connected with the bracket 98 by similar bolts. The free ends of said bars 92 and 94 are provided with outstanding arms 106 and 108 which may be electrically connected through said brackets 96 and 98 with the pots of their respective electrolyte-containing switches 26 and 28. Said arms are provided with bifurcated outer ends between the bifurcations of which the rods 86 of the disconnecting elements are received. Said rods 86 are provided at their lower ends with suitable abutment members as nuts 110 which are adapted to be engaged by said arms during the latter part of the switch opening movement of the movable switch member.

When the metallic circuit through the interrupter is closed, as illustrated in Fig. 1, said arms 106 and 108 are free from operative engagement with the rods 86 and the springs 88 serve to maintain the contact members of the disconnecting elements in engagement. As the movable switch member is moved downwardly by the weight of the parts to effect circuit interruption, the contact members in the circuit-interrupting elements are separated, while the contact members in the disconnecting elements remain in engagement. At some appropriate part of the downward movement of the movable switch member, as when the pots 38 have moved downwardly sufficiently to bring the normal electrolyte level about at the lower end of the fixed contact members 34, the arms 106 and 108 are adapted to come into engagement with the abutments 110 on the rods 86. A further downward movement of the movable switch member serves to effect the separation of the disconnecting contact members and a further separation of the circuit-interrupting contact members. The current through the switch is adapted ordinarily to have been interrupted before the disconnecting contact-members separate so that no part of the burden of circuit interruption is thrown upon these members. When the switch is moved to closed position, it is readily apparent that the circuit-interrupting contact members are moved into engagement first so that the work of closing the circuit is also carried on in the interrupting switches.

Flexible leads 112 connect said rods 86 with their respective operating arms 106 and 108 whereby to provide connection between said rods and the pots of the associated electrolyte-containing switches. All of the aforesaid contact members are connected in series between the switch terminals as is clearly indicated in Fig. 4. The connection between the fixed contact members of the interrupting disconnecting elements 28 and 32 is effected by means of the conductor 114 while the fixed contact member of the interrupting element 26 is connected to a switch terminal through the conductor 116.

I claim:

1. A circuit interrupter having an electrolyte-containing receptacle, a contact member normally immersed in the electrolyte, means to effect separation between said contact member and the electrolyte including means to displace the body of electrolyte within the receptacle, a pair of oil-immersed contact members, and means to operate said oil-immersed contact members and effect separation of said contact members only after separation of the aforesaid contact member and the electrolyte.

2. An electric switch including an expansible fluid-containing receptacle having relatively fixed and movable closely-fitting telescoping parts normally closed, separable contact members carried by the fixed and movable parts of said expansible receptacle, a yielding support for one part of said receptacle, means to expand said receptacle, whereby to separate said contact members, said means including an actuating member having a lost-motion connection between it and said yieldingly supported part of said receptacle, said telescoping parts constituting guiding means for said contact members.

3. An electric switch including a casing comprising closely fitting fixed and movable telescoping oil-containing tubes which have their opposite ends closed and their contiguous ends open, means fixedly to support one of said tubes, solid contact members carried by said tubes, means to maintain said contact members normally in engagement including springs arranged to urge said movable tube inwardly toward said fixed tube, and means to separate said contact members including means to move said movable tube outwardly against the action of said springs, said tubes constituting guiding means for said contact members.

4. An electric switch including a casing comprising fixed and movable telescoping tubes which have their opposite ends closed, means fixedly to support one of said tubes, contact members carried by said tubes, means to maintain said contact members normally in engagement including springs arranged to urge said movable tube inwardly toward said fixed tube, and means to separate said contact members including means to move said movable tube outwardly against the action of said springs, said means having a lost-motion connection with said movable tube.

5. An electric switch including a movable fluid-containing receptacle, a contact member carried by and disposed within said receptacle, a cooperating fixed contact member extended into said receptacle, guiding means for said receptacle including a guide-plate closely surrounding and having an aperture therein in which said receptacle is movably received, and a switch operating rod connected with the bottom of said receptacle and extended through the aperture in said guide-plate.

6. An electric switch including a movable fluid-containing receptacle, a contact member carried by and disposed within said receptacle, a cooperating fixed contact member extended into said receptacle, guiding means for said receptacle including a guide-plate closely surrounding and having an aperture therein in which said receptacle is movably received, insulating supporting means for said guide-plate, and a switch operating rod connected with said movable contact member and the bottom of said receptacle and extended through the aperture in said guide-plate.

7. An electric switch including a support, a movable fluid-containing receptacle disposed beneath said support, a guide plate loosely surrounding the lower end of said receptacle, insulating members connecting said guide plate and said support, and separable contact members disposed within said receptacle.

8. An electric switch including a support, a movable fluid-containing receptacle disposed beneath said support, a guide plate loosely surrounding the lower end of said receptacle, insulating members connecting said guide plate and said support, and separable contact members disposed within said receptacle having means connecting them respectively with said support and movable receptacle.

9. An electric switch including an inner insulating tube having a cap which forms a cover for the open top of said tube, an outer insulating tube closely surrounding and sliding on said inner insulating tube and having a cap which forms a cover for the open bottom thereof, said inner and outer tubes being in free fluid communication, contact members carried by said caps, a fixed support for said inner tube, and a yielding support for said outer tube.

10. An electric switch including an inner insulating tube having a cap which forms a cover for the open top of said tube, an outer insulating tube closely surrounding and sliding on said inner tube having a cap which forms a cover for the open bottom thereof, said inner and outer insulating tubes being in free communication and constituting an expansible casing, contact members carried by said caps, a fixed support for said inner tube, and a rod fixed to the cap of said outer tube and depending therebelow, means including springs yieldingly connecting said rod with said fixed support, and actuating means for said outer tube including means having a lost-motion connection with said rod.

11. A circuit interrupter including an interrupting switch having fixed and movable contact members and a movable support for said movable contact member, a disconnecting switch in series with said interrupting switch having fixed and movable contact members and an independent movable support for said movable contact member, means directly electrically connecting said movable contact members and lost-motion means whereby one movable support operates the other movable support.

12. A circuit interrupter including an interrupting switch having fixed and movable contact members and a movable support for said movable contact member, a disconnecting switch in series with said interrupting switch having fixed and movable contact members and a spring-supported movable support for said movable contact member independent of said first support, and flexible means directly electrically connecting said movable contact members in series, and means whereby said first support operates said yieldingly-supported movable support.

13. A circuit interrupter including interrupting and disconnecting switches, each having stationary and movable contact members and a receptacle enclosing said contact members and providing a support for said movable contact members, an insulating support for said stationary contact members, said receptacles being separately supported, yielding means connecting the disconnecting switch receptacle with said insulating support, and movable supporting means for said interrupting switch receptacle having a lost-motion connection with said disconnecting switch receptacle.

14. A circuit interrupter including an interrupting switch and a disconnecting switch, said disconnecting switch having separable contact members, resilient means normally holding said contact members in engagement, and operating means for the interrupting switch having a lost-motion connection with said disconnecting switch and arranged to open it against the action of said resilient means.

15. The combination of an interrupting switch normally biased for movement into open position, a disconnecting switch connected in series with said interrupting switch normally biased for movement into closed position, and a common operating means for effecting conjoint opening and closing of said switches.

16. The combination of an interrupting switch normally biased for movement into open position, a disconnecting switch connected in series with said interrupting switch normally biased for movement into closed position, and a common operating means for said switches having provision for operating them in the same direction in succession.

17. The combination of an interrupting switch normally biased for movement into open position, a disconnecting switch connected in series with said interrupting switch normally biased for movement into closed position, and operating means for said switches having provision for maintaining said disconnecting switch open against its bias.

18. The combination of an interrupting switch normally biased for movement into open position, a disconnecting switch connected in series with said interrupting switch normally biased for movement into closed position, and a common operating means for said switches having a lost-motion connection with said disconnecting switch, said operating means having provision for maintaining said disconnecting switch open against its bias.

19. A circuit interrupter having a depending insulating pillar, a pair of switches disposed therebelow and having stationary contact members carried by said pillar, said switches having fluid-containing receptacles and movable contact members carried thereby, yielding supporting means connecting one receptacle with said pillar, and a movable switch member providing a support for the other receptacle and having an operating connection with said yieldingly-supported receptacle.

20. A circuit interrupter having a depending insulating pillar, a pair of switches disposed therebelow and having stationary contact members carried by said pillar, said switches having fluid-containing receptacles and movable contact members carried thereby, yielding supporting means connecting one receptacle with said pillar, and a movable switch member providing a support for the other receptacle and having an operating connection with said yieldingly-supported receptacle and an electrical connection between said movable contact members.

21. A circuit interrupter including a disconnecting switch comprising a yieldingly-supported fluid-containing receptacle having a depending-extension, separable contact members contained therein, one of which is carried by said receptacle, an interrupting switch comprising a fluid-containing receptacle, separable contact members contained therein, one of which is carried by said support, a movable switch member comprising a vertically-movable rod having an insulating support at its lower end, means connecting said interrupting-switch receptacle with said support, and an arm carried by said support having a lost-motion connection with the extension of said disconnecting-switch receptacle.

22. An electric switch having a closed expansible casing composed of a fixed part and a part which is movable toward and away from said fixed part and is biased for movement toward said fixed part, said movable part having a conducting wall, separable contact members located within said casing including a fixed contact member carried by said fixed part, and a movable contact member carried by said movable part and electrically connected within said casing to said conducting wall, and a circuit lead and operating means for moving said movable part both connected externally of said casing with said conducting wall.

23. An electric switch having a closed casing composed of a fixed part and a part which is movable toward and away from said fixed part, said movable part having a conducting wall, separable contact members located within said casing including a fixed contact member carried by said fixed part and a movable contact member carried by said movable part and electrically connected within said casing to said conducting wall, and a circuit lead and operating means for moving said movable part both connected externally of said casing with said conducting wall, said conducting wall being imperforate.

24. An electric switch having a closed casing composed of a fixed part and a part which is movable toward and away from said fixed part while maintaining the closure of the casing, said movable part including a conducting wall, separable contact members located within said casing including a movable contact member having an operative connection within said casing with said conducting wall, and operating means connected externally of said casing with said conducting wall, said wall being imperforate.

25. An electric switch having a closed casing composed of a fixed part and a part which is movable toward and away from said fixed part while maintaining the closure of the casing, said movable part including a conducting wall, separable contact members located within said casing including a movable contact member having an operative mechanical and also an electrical connection within said casing with said conducting wall, and operating means external of said casing connected with said wall, said wall also constituting an exposed electrical terminal for said movable contact member.

26. An electric switch including a closed expansible casing having a fixed part and a part which is movable toward and away from said fixed part while maintaining the closure of the casing and is biased for movement toward said fixed part, separable contact members located within said casing having an operative connection with said movable part of said casing, whereby to be engaged and separated by movements of said movable part, switch operating mechanism having means for moving said movable part between switch open and closed position, and means for holding said movable part in one position against the bias thereof.

In testimony whereof, I have signed my name to this specification.

DAVID C. GARROWAY.